(12) United States Patent
Kodama

(10) Patent No.: US 8,792,925 B2
(45) Date of Patent: Jul. 29, 2014

(54) MOBILE STATION AND COMMUNICATION CONTROL METHOD

(75) Inventor: Takeshi Kodama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 574 days.

(21) Appl. No.: 13/072,237

(22) Filed: Mar. 25, 2011

(65) Prior Publication Data

US 2011/0244911 A1   Oct. 6, 2011

(30) Foreign Application Priority Data

Mar. 30, 2010   (JP) .................................. 2010-78547

(51) Int. Cl.
*H04B 7/00* (2006.01)
*H04W 4/00* (2009.01)

(52) U.S. Cl.
CPC ..................................... *H04W 4/00* (2013.01)
USPC ............... 455/517; 455/522; 455/69; 455/70; 455/515

(58) Field of Classification Search
USPC ................... 455/522, 69–70, 550.1, 517, 515
See application file for complete search history.

(56) References Cited

U.S. PATENT DOCUMENTS

| 7,483,373 | B2 * | 1/2009 | Willey et al. .................. 370/231 |
| 2011/0058476 | A1 * | 3/2011 | Willey et al. .................. 370/235 |

FOREIGN PATENT DOCUMENTS

| JP | 2005-102135 A | 4/2005 |
| JP | 2007-525866 A | 9/2007 |
| JP | 2008-160303 | 7/2008 |

OTHER PUBLICATIONS

Arib, et al., "MITF Dial Up Dormant Protocol", ARIB Standard, Jul. 27, 2001.
Japanese Office Action mailed Jul. 9, 2013 for corresponding Japanese Application No. 2010-078547, with Partial English-language Translation.
Office Action of Japanese Patent Application No. 2010-078547 dated Jan. 28, 2014, with Partial Translation.

* cited by examiner

*Primary Examiner* — Fayyaz Alam
(74) *Attorney, Agent, or Firm* — Fujitsu Patent Center

(57) ABSTRACT

A mobile station for wirelessly communicating with a base station, the mobile station including a storage unit for storing determination information for determining whether or not an application that requires wireless communication is being executed and operation information defining whether or not the application maintains a logical connection when the application is out-of-service for each application; and a processor for, when detecting out-of-service state, determining an application being executed on the basis of the determination information, determining whether or not the application being executed maintains the logical connection on the basis of the operation information, and when determining that the application maintains the logical connection, trying to wirelessly connect to the base station.

15 Claims, 17 Drawing Sheets

FIG. 4

| APPLICATION NAME | DESTINATION PORT NUMBER | TRANSMISSION SOURCE PORT NUMBER | EXECUTING FLAG |
|---|---|---|---|
| WEB BROWSER | 80 | - | OFF |
| FTP | 20 | - | OFF |
| VoIP | 5060 | - | OFF |

FIG. 5

| APPLICATION NAME | OUT-OF-SERVICE OPERATION | CONNECTION MAINTAINING TIME |
|---|---|---|
| WEB BROWSER | DISCONNECTING CONNECTION | - |
| FTP | MAINTAINING CONNECTION | 30sec |
| VoIP | MAINTAINING CONNECTION | 5sec |

MOBILE STATION AND COMMUNICATION CONTROL METHOD

CROSS-REFERENCE TO RELATED APPLICATION

This application is based upon and claims the benefit of priority from the prior Japanese Patent Application No. 2010-78547 filed on Mar. 30, 2010, the entire contents of which are incorporated herein by reference.

FIELD

The present invention relates to a mobile station wirelessly communicating with a base station and a communication control method.

BACKGROUND

In a mobile communication system including a base station (BS) that provides a wireless communication service and a mobile station (MS), the MS is generally located in an area (service area of the BS) in which the BS can provide the service. When an MS is in a service area of a BS, the MS can communicate with a server or the like on a network via the BS. However, even when the MS is located in the service area, if the MS moves in the shade of a building or the like, the MS may not be able to receive radio waves from the BS and may temporarily be in a state (out-of-service) in which the MS cannot communicate. If the MS becomes out-of-service, an application performing communication between the BS and the MS is disconnected, or interrupted. Thereafter, the application can restart the communication when the MS receive radio waves from the BS.

However, in a case of an application that transmits file data by using FTP (File Transfer Protocol), if the connection is disconnected during communication, the file data has to be transmitted/received again from the beginning. As a result, resources such as time and frequency band are wasted. Therefore, even if the MS becomes a state of out-of-service, there is a request to maintain the connection of the application as much as possible. In a case of file transmission using FTP, if the connection is disconnected while transmitting file data, basically, the file is transmitted again from the beginning.

Here, as a method for maintaining the connection of application even in a state of out-of-service, there is a method that uses a dormant mode. When no data has been transmitted for a time period, the connection comes to the dormant mode (dormant state) that disconnects only a connection in a lower layer while maintaining a connection in an upper layer. For example, the upper layer is a session layer, and the lower layer is a link layer. When restarting communication, the dormant mode restarts communication by restoring (reconnecting) the connection in the lower layer.

Originally, the object of the dormant mode is to efficiently use resources in a service area. By applying the dormant mode when out-of-service is detected, the connection of the application can be maintained even in a state of out-of-service. When the connection in the lower layer is restored, the application can restart communication from a state before the MS entered an out-of-service area.

On the other hand, there is a technique in which a wireless communication mobile station refers to data that have been transmitted/received for a predetermined period in the past and determines a cycle for searching a base station on the basis of the reference result, the mobile station determining that the mobile station is in an out-of-service area of a base station.

Japanese Unexamined Patent Application Publication No. 2008-160303 is an example of related art.

MITF Dial-up Dormant Protocol Specifications (ARIB STD-T78 ver. 1.0) Jul. 27, 2001, Association of Radio Industries and Businesses is an example of related art.

SUMMARY

According to an aspect of the invention, a mobile station for wirelessly communicating with a base station, the mobile station including: a storage unit for storing determination information for determining whether or not an application that requires wireless communication is being executed and operation information defining whether or not the application maintains a logical connection when the mobile station is out-of-service for each application; and a processor for, when detecting out-of-service state, determining an application being executed on the basis of the determination information, determining whether or not the application being executed maintains the logical connection on the basis of the operation information, and when determining that the application maintains the logical connection, trying to wirelessly connect to the base station.

The object and advantages of the invention will be realized and attained by at least the elements, features, and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of application determination information;

FIG. 5 is a diagram illustrating an example of operation management information;

DESCRIPTION OF EMBODIMENTS

From the viewpoint of a user, a request for an operation (disconnecting connection or maintaining connection, and maintaining time) in an out-of-service area is different for each application. For example, when using an application whose communication time is relatively long such as a file transfer application that uses FTP, it is desirable that a logical connection is maintained even when the MS becomes out-of-service so that the communication can be restarted when the MS enters a service area.

On the other hand, for example, when using an application such as a Web browser, whose communication time is relatively short and which establishes a connection as needed when performing communication, it is desirable that out-of-service is quickly detected and the logical connection is disconnected. In conventional techniques, the operation in an out-of-service area is the same regardless of the type of application. Therefore, when the operation in an out-of-service area is set to maintaining connection, if the MS becomes out-of-service while Web browsing, the connection is apparently maintained because the logical connection is maintained. However, a response to a data request does not return unless the wireless communication is restarted. On the other hand, when the operation in an out-of-service area is set to disconnecting connection, if the MS becomes out-of-service while transferring a file, the connection is disconnected, so that the file has to be transferred again from the beginning, and thus frequency band is wasted.

Therefore, the disclosed technique is made in view of the above problems, and an object of the technique is to perform appropriate out-of-service processing on an application being executed when a mobile station becomes out-of-service.

Hereinafter, embodiments will be described in detail with reference to the attached drawings.

First Embodiment

Figure 1:
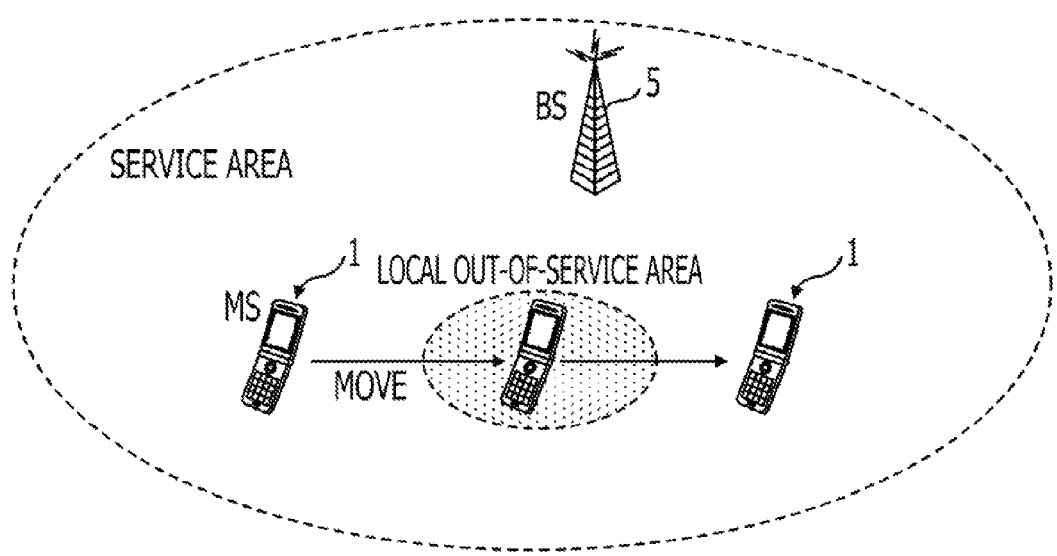
FIG. 1 is a diagram illustrating an example of a wireless communication system.

FIG. 1 is a diagram illustrating an example of a wireless communication system according to embodiments. The wireless communication system illustrated in FIG. 1 includes a mobile station (MS) 1 and a wireless base station (BS) 5. In the example illustrated in FIG. 1, there is an out-of-service area locally in a service area of the wireless base station 5. The service area is referred to as area #1 and the out-of-service area is referred to as area #2. Hereinafter, it is assumed that the mobile station 1 passes through the area #2.

Hardware

Figure 2:
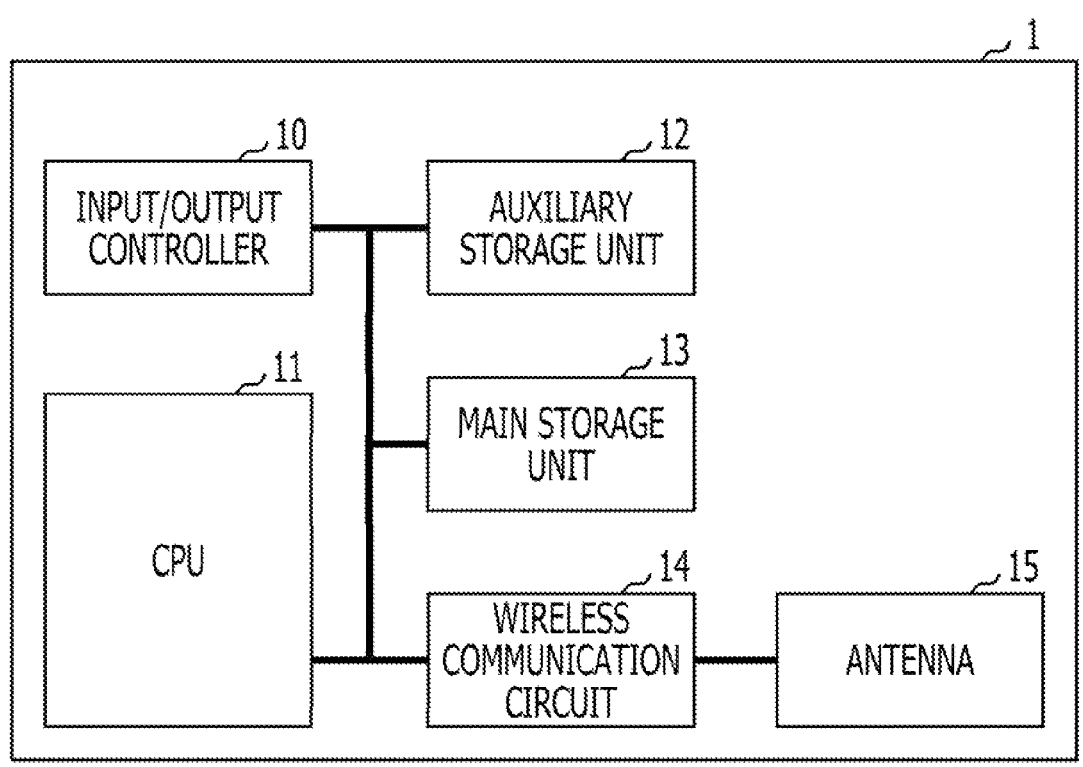
FIG. 2 is a block diagram illustrating an example of hardware of a mobile station.

FIG. 2 is a block diagram illustrating an example of hardware of the mobile station 1. As illustrated in FIG. 2, the mobile station 1 includes an input/output controller 10, a CPU (Central Processing Unit) 11, an auxiliary storage unit 12, a main storage unit 13, a wireless communication circuit 14, and an antenna 15.

The input/output controller 10 controls inputs from an input device (a key input unit of the mobile station 1 or the like). The input/output controller 10 controls output to an output device (a monitor or the like). The CPU 11 executes various programs. The CPU 11 is a so-called processor, and controls processing of each unit.

The auxiliary storage unit 12 and the main storage unit 13 store programs and data necessary to execute the programs. The wireless communication circuit 14 performs communication through a network via the antenna 15. The antenna 15 transmits and receives wireless signals.

Functions

Figure 3:
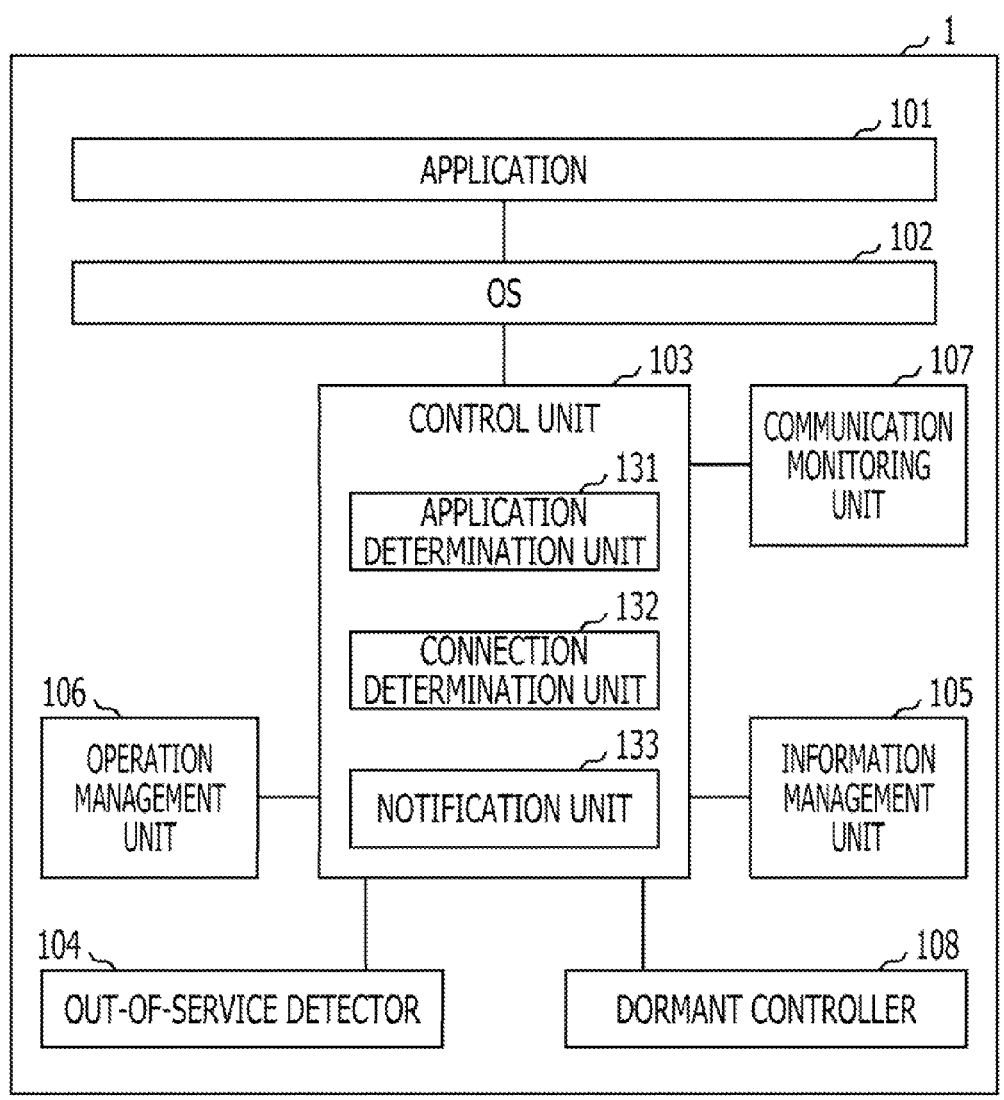
FIG. 3 is a block diagram illustrating an example of functions of the mobile station according to a first embodiment.

FIG. 3 is a block diagram illustrating an example of functions of the mobile station 1 according to the first embodiment. As illustrated in FIG. 3, the mobile station 1 includes an application 101, an OS (operating system) 102, a control unit 103, an out-of-service detector 104, an information management unit 105, an operation management unit 106, a communication monitoring unit 107, and a dormant controller 108.

The application 101 is, for example, an application for performing communication. When the application 101 is notified of a disconnection of the wireless connection from the OS 102, the application 101 disconnects a logical connection.

The OS 102 receives a notification from the control unit 103 and notifies the application that the wireless connection is disconnected. The OS 102 outputs a packet obtained from the control unit 103 to the application. The control unit 103 receives notifications from each functional unit, determines processing to be performed next, and requests an appropriate functional unit to perform the processing. The details of the control unit 103 will be described below.

When the out-of-service detector 104 detects out-of-service, the out-of-service detector 104 notifies the control unit 103 that the out-of-service detector 104 detects out-of-service. The out-of-service detector 104 detects out-of-service when a connection in a lower layer, for example, a connection in a link layer of the mobile station is disconnected, or when the out-of-service detector 104 cannot regularly receive a signal including profile information of the base station 5 or the strength of a radio wave of the received signal is smaller than a threshold value. When out-of-service is detected, the mobile station 1 disconnects the connection in a lower layer, for example, the connection in the link layer.

For each application, the information management unit 105 holds a corresponding port number and a flag indicating whether the application is being executed. Hereinafter, the information held by the information management unit 105 is referred to as application determination information. The application determination information is information for determining whether an application that needs wireless communication is executed.

FIG. 4 is a diagram illustrating an example of the application determination information. In the application determination information illustrated in FIG. 4, a destination port number, a transmission source port number, and an executing flag are associated with an application name. In the example illustrated in FIG. 4, the destination port number "80" is associated with "Web browser", the destination port number "20" is associated with "FTP", and the destination port number "5060" is associated with "VoIP". The "destination port number" is provided from an application when the application is started. The "executing flag" is changed to "ON" by the control unit 103 that detects the start of the application.

Return to FIG. 3. The operation management unit 106 holds operation management information. When the mobile station 1 cannot receive radio waves from the base station 5, for example, when the mobile station 1 is in an out-of-service area, information indicating whether or not the logical connection is maintained and a time period for maintaining the connection are held in the operation management information for each application. The logical connection is, for example, a session connection of the application.

FIG. 5 is a diagram illustrating an example of the operation management information. In the operation management information illustrated in FIG. 5, an out-of-service operation indicating an operation performed in an out-of-service area and a connection maintaining time indicating a time period for performing a dormant control are associated with an application name. In the example illustrated in FIG. 5, "disconnecting connection" is associated with "Web browser", and "maintaining connection" and "30 sec" are associated with "FTP". This indicates that "connection is disconnected" for the application "Web browser" in an out-of-service area. Also, this indicates that "connection is maintained" for "30 sec" for the application "FTP" in an out-of-service area.

Return to FIG. 3. The communication monitoring unit 107 analyzes a packet transmitted or received by the application 101 and detects start and end of communication. For example, in a case in which the application 101 uses TCP protocol, the communication monitoring unit 107 refers to the TCP header, determines that communication is started when the SNY bit is 1, and determines that communication is ended when the FIN bit is 1. If the communication monitoring unit 107 cannot determine start/end of communication by only monitoring the header as in the case of the SIP protocol that is often used in VoIP, the communication monitoring unit 107 may determine start/end of communication by analyzing data portion of the packet. For example, if the data portion includes the character string "Hello", the communication monitoring unit 107 determines that communication is started, and if the data portion includes the character string "Bye", the communication monitoring unit 107 determines that communication is ended.

As an application for analyzing data portion of a packet, for example, there is a moving image delivery (VOD: Video On Demand). In a VOD application, RTP/RTSP protocol is used. In the RTP/RTSP protocol, start or end of delivery of moving image cannot be determined unless data portion is analyzed.

When the communication monitoring unit 107 detects start or end of communication, the communication monitoring unit 107 notifies the control unit 103 of the port number used by the application 101. The communication monitoring unit 107 always measures a time from when data is transmitted to when a response is received (RTT: Round Trip Time). The communication monitoring unit 107 calculates a retransmission time-out value (RTO: Retransmission Time Out) and a time to be elapsed until retransmission retry time-out occurs on the basis of the measured RTT. The communication monitoring unit 107 may register a time to be elapsed until the retransmission time-out occurs into the information management unit 105 as a connection maintaining time. The connection maintaining time will be described in detail in a second embodiment.

The dormant controller 108 performs restoration processing of connection of, for example, a link layer, which is a lower layer. The restoration processing is, for example, processing for repeatedly sending a connection request until the wireless connection to the base station BS5 is restarted. While the restoration processing is performed, the logical connection is maintained. If the connection maintaining time is set, the dormant controller 108 performs the restoration processing from when the restoration processing is started to when the connection maintaining time elapses. The dormant controller 108 may perform the restoration processing when the mobile station 1 is in an out-of-service area or the dormant controller 108 may perform the restoration processing after the mobile station 1 is detected to return to a service area from an out-of-service area. If the restoration processing is performed when the mobile station 1 is in an out-of-service area, it is highly likely that the communication is restarted earlier.

The details of the control unit 103 will be described. The control unit 103 includes an application determination unit 131, a connection determination unit 132, and a notification unit 133. When the application determination unit 131 is notified from the out-of-service detector 104 that out-of-service is detected, the application determination unit 131 refers to the application determination information managed in the information management unit 105 and determines an application whose executing flag is "ON". The application determination unit 131 notifies the connection determination unit 132 of the application being executed.

The connection determination unit 132 refers to the operation management information managed in the operation management unit 106, and determines the out-of-service operation of the application being executed. The connection determination unit 132 notifies the notification unit 133 of the determined out-of-service operation.

If the maintaining connection is determined by the connection determination unit 132, the notification unit 133 sends a notice to maintain the logical connection to the dormant controller 108. If the disconnecting connection is determined by the connection determination unit 132, the notification unit 133 notifies the OS 102 that the wireless connection is disconnected.

The application 101, the OS 102, the control unit 103, the no-service area detector 104, the communication monitoring unit 107, and the dormant controller 108 can be implemented by, for example, the CPU 11 and the main storage unit 13. The information management unit 105 and the operation management unit 106 can be implemented by, for example, the main storage unit 13 and/or the auxiliary storage unit 12.

Based on this, when the mobile station 1 detects out-of-service, the mobile station 1 can determine the operation of the application being executed in the out-of-service area and perform appropriate processing on the application being executed.

Operation

Figure 6:
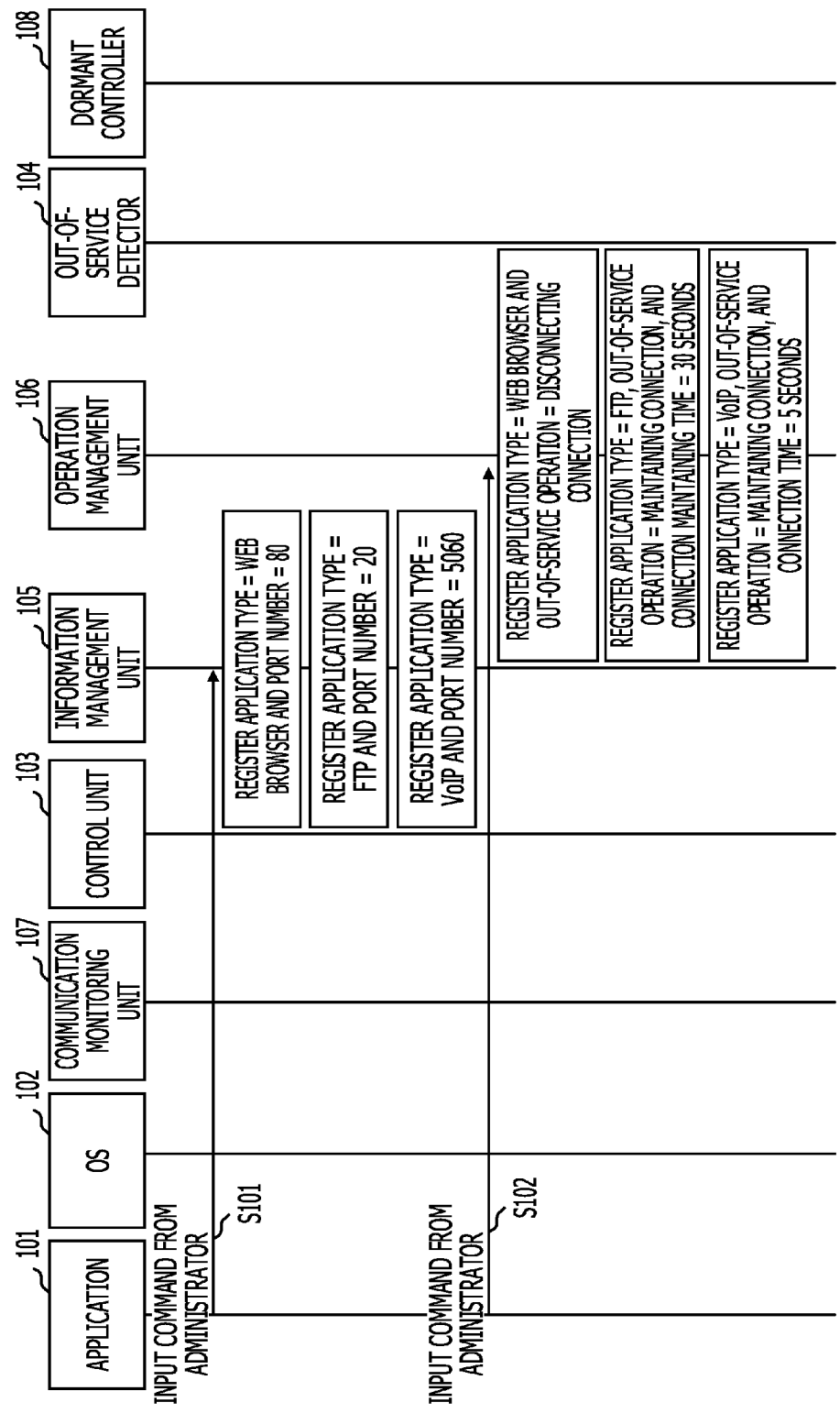
FIG. 6 is a sequence diagram illustrating an example of registration processing of the application determination information and the operation management information.

Next, the operation of the mobile station 1 will be described. FIG. 6 is a sequence diagram illustrating an example of registration processing of the application determination information and the operation management information. As illustrated in FIG. 6, in step S101, the application determination information is registered by, for example, a command inputted by an administrator. In the example illustrated in FIG. 6, the port number "80" is associated with "Web browser", the port number "20" is associated with "FTP", and the port number "5060" is associated with "VoIP".

In step S102, the operation management information is registered by, for example, a command inputted by an administrator. In the example illustrated in FIG. 6, "disconnecting connection" is associated with "Web browser", "maintaining connection" and "30 sec" are associated with "FTP", and "maintaining connection" and "5 sec" are associated with "VoIP".

Figure 7:
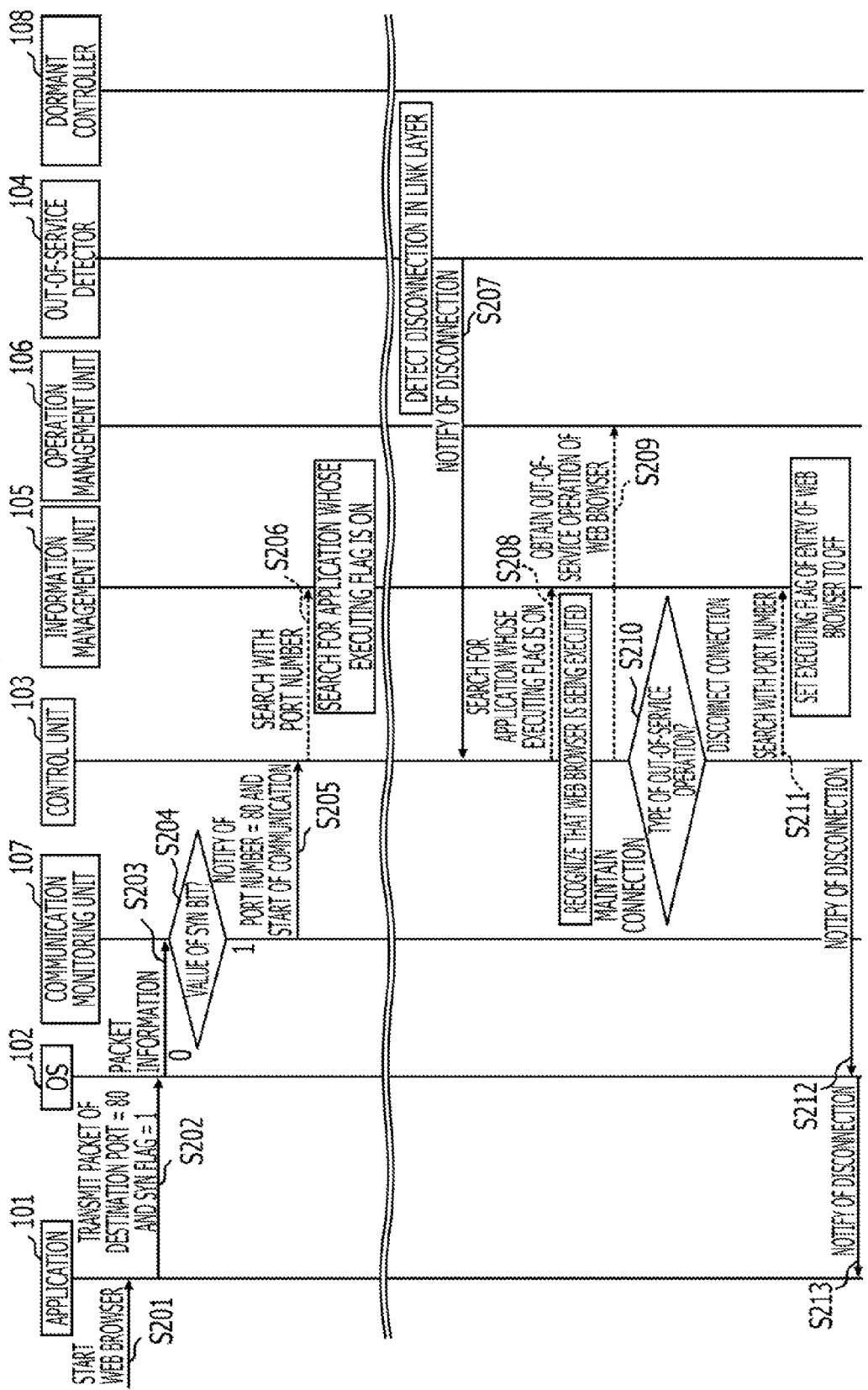
FIG. 7 is a sequence diagram illustrating an example of out-of-service processing according to the first embodiment.

FIG. 7 is a sequence diagram illustrating an example of out-of-service processing 1 according to the first embodiment. In step S201 illustrated in FIG. 7, a user starts the application 101. In the example illustrated in FIG. 7, it is assumed that a Web browser starts as the application 101.

In steps S202 and S203, to start communication with a Web server, the application 101 (Web browser) transmits a packet in which the destination port number of the TCP header is set to "80" and the SYN flag is set to "1" to the Web server via the OS 102. The communication monitoring unit 107 monitors the communication between the OS 102 and the Web server.

In step S204, the communication monitoring unit 107 determines whether the value of the SYN flag included in the packet information is "0" or "1". Here, the SYN flag is assumed to be "1" which indicates start of the communication. In step S205, the communication monitoring unit 107 notifies the control unit 103 of the destination port number "80" and start of the communication.

In step S206, the control unit 103 searches for the application of the notified port number "80" from the application determination information. The control unit 103 changes the executing flag of the searched application (Web browser) to "ON".

In step S207, the out-of-service detector 104 detects out-of-service from a state in which the strength of a radio wave is smaller than a threshold value, a signal regularly transmitted from the base station 5 is not received regularly, the connection in the link layer is disconnected, or the like. When out-of-service is detected, if the out-of-service is detected from the strength of a radio wave or regular signal reception, the connection in the link layer is disconnected. When the out-of-service detector 104 detects out-of-service, the out-of-service detector 104 notifies the control unit 103 of the out-of-service.

In step S208, when the control unit 103 receives the notice of out-of-service, the control unit 103 refers to the application determination information and searches for an application whose executing flag is "ON". At this time, the control unit 103 recognizes that the "Web browser" is being executed.

In step S209, the control unit 103 refers to the operation management information and obtains the out-of-service operation of the "Web browser". At this time, the control unit 103 obtains the "disconnecting connection" according to the example illustrated in FIG. 5.

In step S210, the control unit 103 determines whether the obtained out-of-service operation is the "maintaining connection" or the "disconnecting connection". The out-of-service operation of the "Web browser" is the "disconnecting connection". In step S211, the control unit 103 searches for the port number "80" of the "Web browser" from the application determination information. The control unit 103 changes the executing flag of the searched "Web browser" to "OFF".

In step S212, the control unit 103 notifies the OS 102 of disconnection of the wireless connection. In step S213, the OS 102 notifies the application 101 of the disconnection of the wireless connection. When the application 101 is notified of the disconnection of the wireless connection, the application 101 disconnects the logical connection.

Based on this, even in the mobile station 1 that uses the dormant mode, the dormant control is not performed uniformly on all applications being executed when out-of-service is detected, but only connections for predetermined applications can be disconnected.

Figure 8:
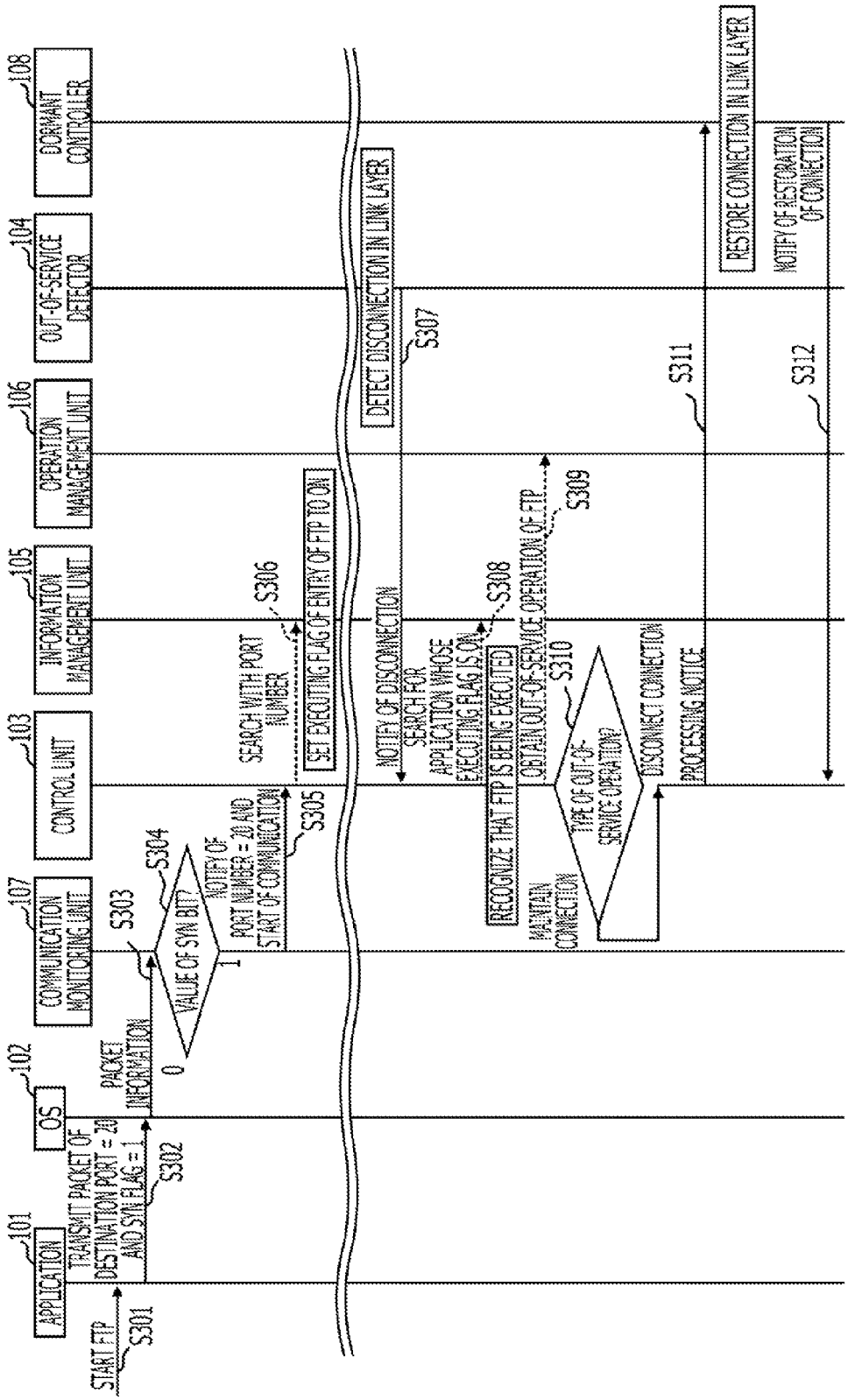
FIG. 8 is a sequence diagram illustrating an example of out-of-service processing according to the first embodiment.

FIG. 8 is a sequence diagram illustrating an example of out-of-service processing 2 according to the first embodiment. In step S301 illustrated in FIG. 8, a user starts the application 101. In the example illustrated in FIG. 8, it is assumed that an FTP application starts as the application 101.

In steps S302 and S303, to start data communication with a server, the application 101 (FTP application) transmits a packet in which the destination port number of the TCP header is set to "20" and the SYN flag is set to "1" to the server via the OS 102.

In step S304, the communication monitoring unit 107 determines whether the value of the SYN flag included in the packet information is "0" or "1". Here, since the communication starts, the SYN flag is "1". In step S305, the communication monitoring unit 107 notifies the control unit 103 of the port number "20" and start of the communication.

In step S306, the control unit 103 searches for the application of the notified port number "20" from the application determination information. The control unit 103 changes the executing flag of the searched application to "ON".

In step S307, the out-of-service detector 104 detects out-of-service from a state in which the strength of a radio wave is smaller than a threshold value, a signal regularly transmitted from the base station 5 is not received regularly, the connection in the link layer is disconnected, or the like. When the out-of-service detector 104 detects out-of-service, the out-of-service detector 104 notifies the control unit 103 of the out-of-service.

In step S308, when the control unit 103 receives the notice of out-of-service, the control unit 103 refers to the application determination information and searches for an application whose executing flag is "ON". At this time, the control unit 103 recognizes that the "FTP" is being executed.

In step S309, the control unit 103 refers to the operation management information and obtains the out-of-service operation of the "FTP". At this time, the control unit 103 obtains the "maintaining connection" according to the example illustrated in FIG. 5.

In step S310, the control unit 103 determines whether the obtained out-of-service operation is the "maintaining connection" or the "disconnecting connection". The out-of-service operation of the "FTP" is the "maintaining connection". In step S311, the control unit 103 sends a processing notice to the dormant controller 108. At this time, the processing notice may include information of a base station different from the base station whose wireless connection has been disconnected, and the wireless connection may be restored to the base station different from the base station whose wireless connection has been disconnected. When the dormant controller 108 receives the processing notice from the control unit 103, the dormant controller 108 performs processing for restoring the connection in the link layer, for example, the connection in the wireless network. In the example illustrated in FIG. 8, it is assumed that the connection in the link layer is restored. In step S312, the dormant controller 108 notifies the control unit 103 of the restoration of the connection.

In this way, the application 101 (FTP application) can restart communication without knowing the disconnection of the connection in a lower layer, for example, in the link layer while maintaining the connection in a higher layer, for example, in the session layer. Therefore, the FTP application can restart the communication from the state before the mobile station 1 entered an out-of-service area.

As described above, according to the first embodiment, when the mobile station is in an out-of-service area, appropriate processing can be performed on an application being executed. To determine the application being executed, the OS 102 may notify the control unit 103 of the application being executed when the application is started, and thereby the control unit 103 sets the flag of the application in the information management unit 105 to "ON". In the operation management information illustrated in FIG. 5, a destination port number may be used instead of the application name.

Second Embodiment

Next, a mobile station 2 according to a second embodiment will be described. In the second embodiment, a time period for performing the dormant control is set. Hereinafter, the time period for performing the dormant control is referred to as a connection maintaining time.

Functions

Figure 9:
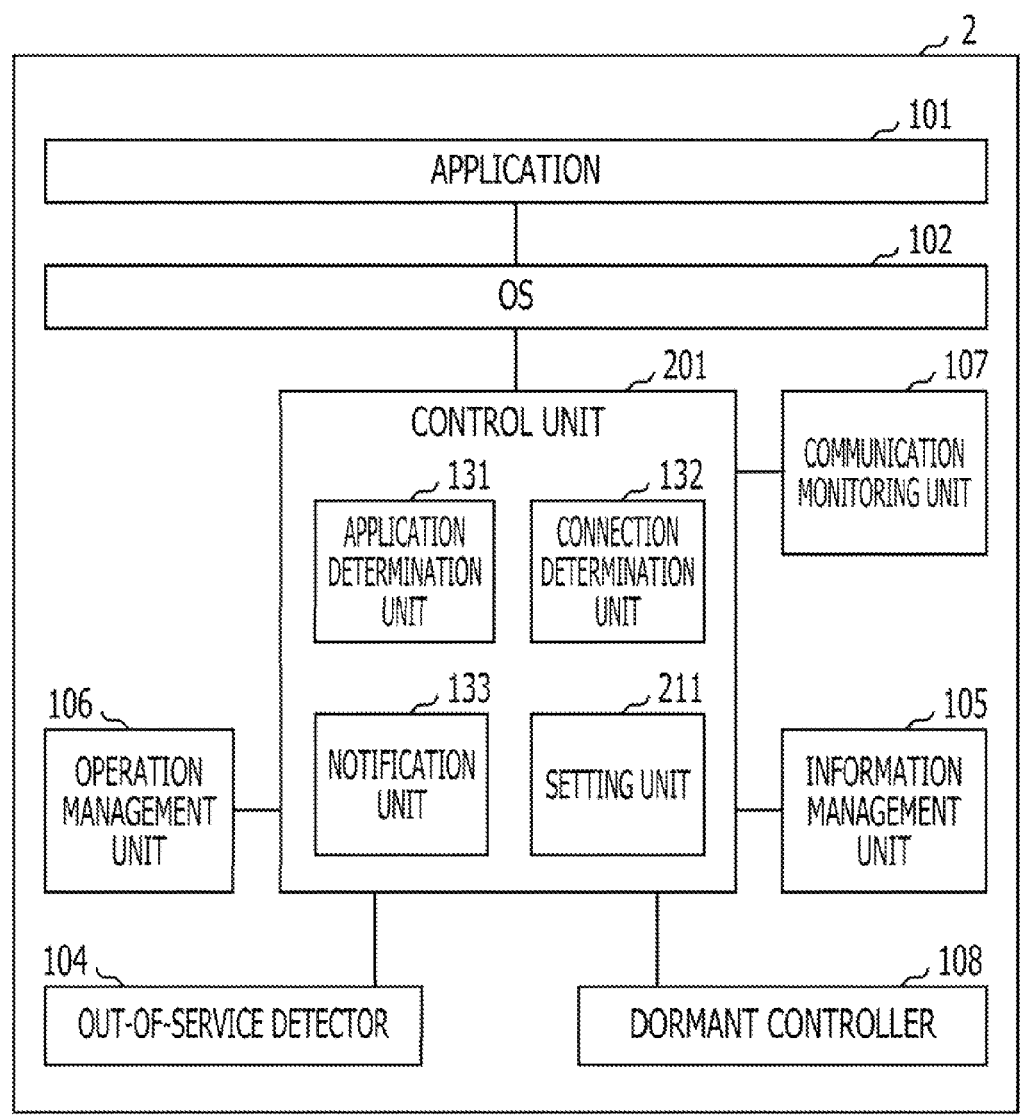
FIG. 9 is a block diagram illustrating an example of functions of a mobile station according to a second embodiment.

FIG. 9 is a block diagram illustrating an example of functions of the mobile station 2 according to the second embodiment. In the functions illustrated in FIG. 9, the same functions as those illustrated in FIG. 3 are given the same reference numerals as in FIG. 3. A control unit 201 illustrated in FIG. 9 includes a setting unit 211. The setting unit 211 sets a time period of the restoration processing of the dormant controller 108. The setting unit 211 sets the connection maintaining time included in the operation management information (see FIG. 5) as the time period for performing the restoration processing. The setting unit 211 counts the time from when the setting unit 211 instructs the dormant controller 108 to perform the restoration processing, and when the count value exceeds the connection maintaining time, the setting unit 211 notifies the dormant controller 108 of the stop of the restoration processing.

The setting unit 211 may set a value calculated by the communication monitoring unit 107 as the connection maintaining time. The calculation of the communication monitoring unit 107 is as follows:

(Calculation of RTO Value)

$$SRTT = 7/8 \times SRTT + 1/8 \times RTT \quad \text{Formula (1)}$$

$$V = V + 1/8 \times (|RTT - SRTT| - V) \quad \text{Formula (2)}$$

$$RTO = SRTT + 4 \times V \quad \text{Formula (3)}$$

(Time to be Elapsed Until Retransmission Retry Time-Out Occurs)

Time to be elapsed until retransmission retry time-out occurs = RTO × 5    Formula (4)

RTT: Round Trip Time, SRTT: Smoothed RTT, RTO: Retransmission Timeout

As the connection maintaining time, the time to be elapsed until retransmission retry time-out occurs is set. The number "5" in Formula (4) is a standard value of the number of retry times set in Windows (registered trademark).

When the dormant controller 108 detects that the connection is restarted, the dormant controller 108 sends a notice of the stop of the time count to the setting unit 211. When the setting unit 211 receives the notice of the stop of the time count from the dormant controller 108, the setting unit resets the time and stops the time count. In this way, it is possible to prevent the dormant control from being performed indefinitely.

Operation

Figure 10:
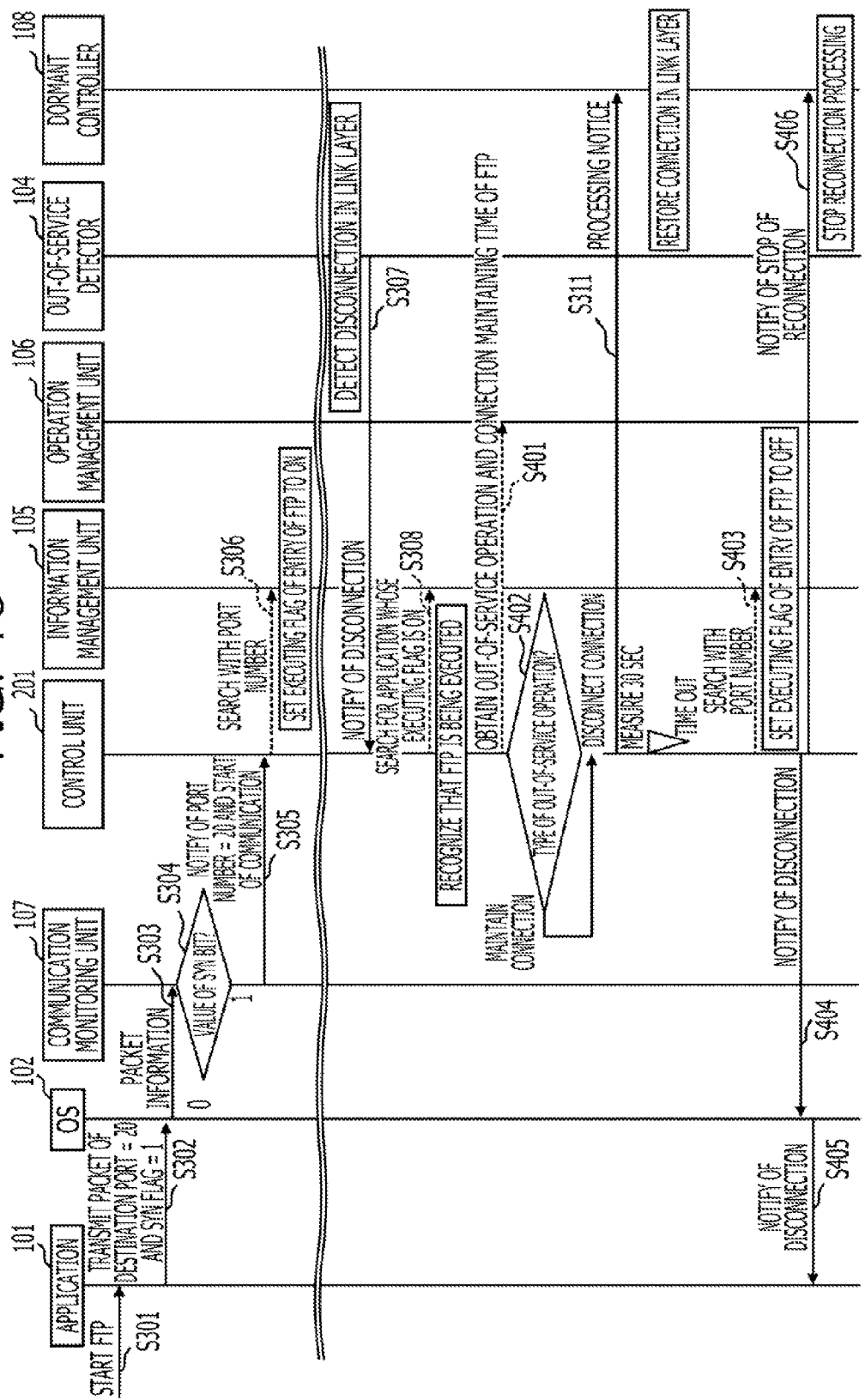
FIG. 10 is a sequence diagram illustrating an example of out-of-service processing according to the second embodiment.

FIG. 10 is a sequence diagram illustrating an example of out-of-service processing 3 according to the second embodiment. In FIG. 10, the same processing steps as those illustrated in FIG. 8 are given the same reference symbols as in FIG. 8. In step S401 illustrated in FIG. 10, the control unit 201 obtains the out-of-service operation and the connection maintaining time from the operation management information.

In step S402, if the type of the out-of-service operation is "maintaining connection", the control unit 201 sets the obtained connection maintaining time as the time period for performing the dormant control. Here, the connection maintaining time of "FTP" is "30 sec", so that 30 seconds are set. The control unit 201 counts the time from when the control unit 201 sends the notice in step S311.

If a time-out occurs without a notice from the dormant controller 108, in step S403, the control unit 201 searches the application determination information by using the port number "20". The control unit 201 changes the executing flag "ON" of the searched application (FTP application) in the application determination information to "OFF".

In step S404, the control unit 201 notifies the OS 102 of disconnection of the connection in the link layer, for example, disconnection of the wireless connection. In step S405, the OS 102 notifies the application 101 of the disconnection of the wireless connection. In step S406, the control unit 201 notifies the dormant controller 108 of the stop of reconnection (restoration processing). In this way, it is possible to prevent the dormant control from being performed indefinitely.

Figure 11:
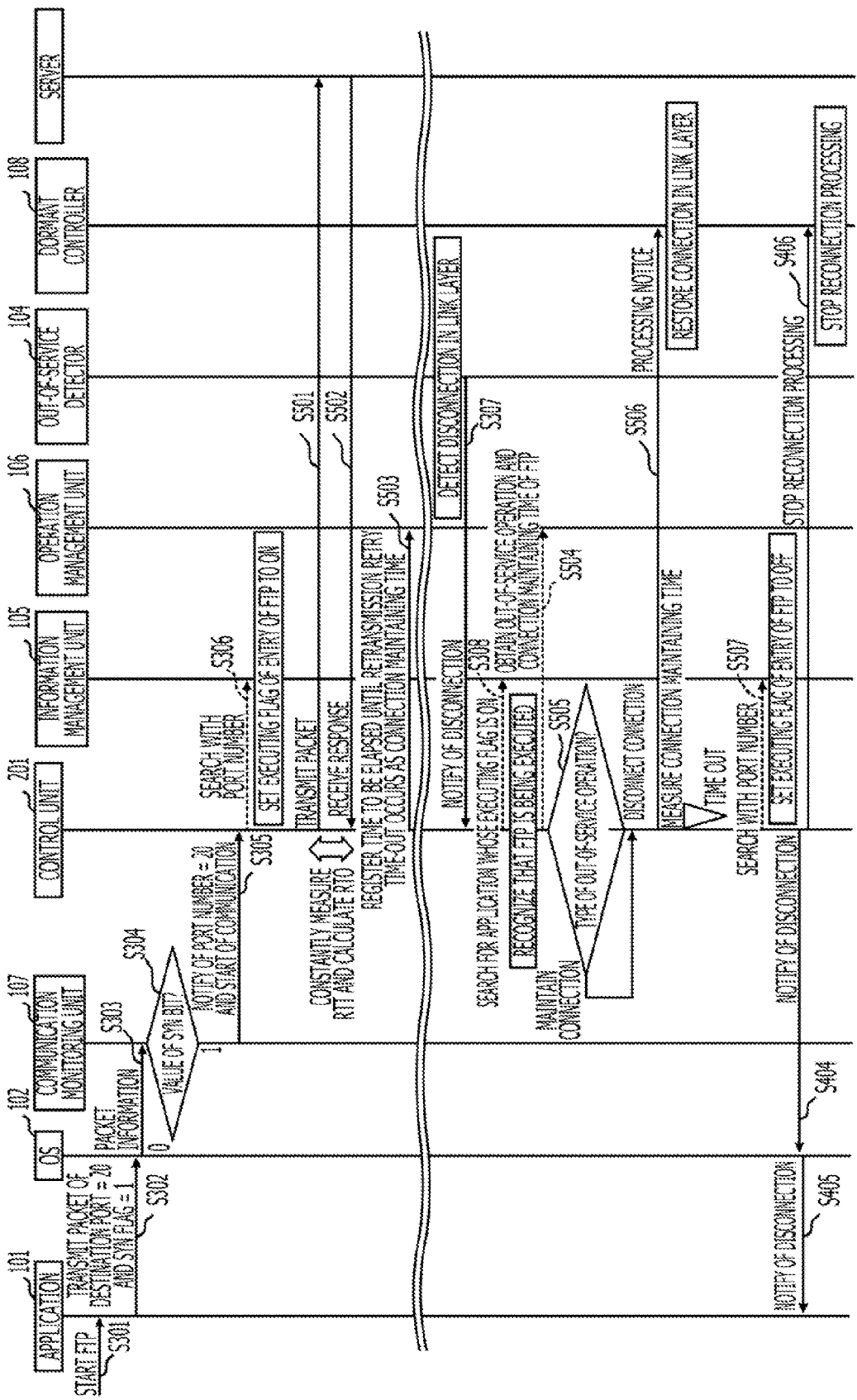
FIG. 11 is a sequence diagram illustrating an example of out-of-service processing according to the second embodiment.

FIG. 11 is a sequence diagram illustrating an example of out-of-service processing 4 according to the second embodiment. In the processing 4, the connection maintaining time calculated on the basis of the RTT is set as the time period for performing the restoration processing. In FIG. 11, the same processing steps as those illustrated in FIGS. 8 and 10 are given the same reference symbols as in FIGS. 8 and 10.

In step S501 illustrated in FIG. 11, the communication monitoring unit 107 transmits a packet to the base station 5. In step S502, the communication monitoring unit 107 receives a response from the base station 5. At this time, the communication monitoring unit 107 measures the time (RTT) from when the packet is transmitted to when the response is received, calculates the RTO (Formula 3), and calculates the time to be elapsed until retransmission retry time-out occurs (Formula 4).

In step S503, the communication monitoring unit 107 registers the calculated time to be elapsed until retransmission retry time-out occurs in the application determination information as the connection maintaining time. A default value may be set as the connection maintaining time until the connection maintaining time is registered in step S503. In step S504, the control unit 201 refers to the operation management information and obtains the out-of-service operation and the connection maintaining time of the "FTP".

In step S505, the control unit 201 determines the type of the obtained out-of-service operation. In this case, the out-of-service operation indicates the "maintaining connection". In step S506, the control unit 201 notifies the dormant controller 108 of the restoration processing of the connection, and then starts the count of the connection maintaining time obtained in step S504. For example, it is assumed that "35 sec" calculated by Formula 4 is set as the connection maintaining time.

When the connection maintaining time is elapsed from when the control unit 201 sends the processing notice to the dormant controller 108, in step S507, the control unit 201 searches for the destination port number "20" from the application determination information. The control unit 201 changes the executing flag corresponding to the searched port number "20" to "OFF". In this way, the communication monitoring unit 107 calculates the connection maintaining time based on the RTT or the RTO, and the control unit 201 can set the calculated connection maintaining time as the time period for performing the dormant control.

Figure 12:
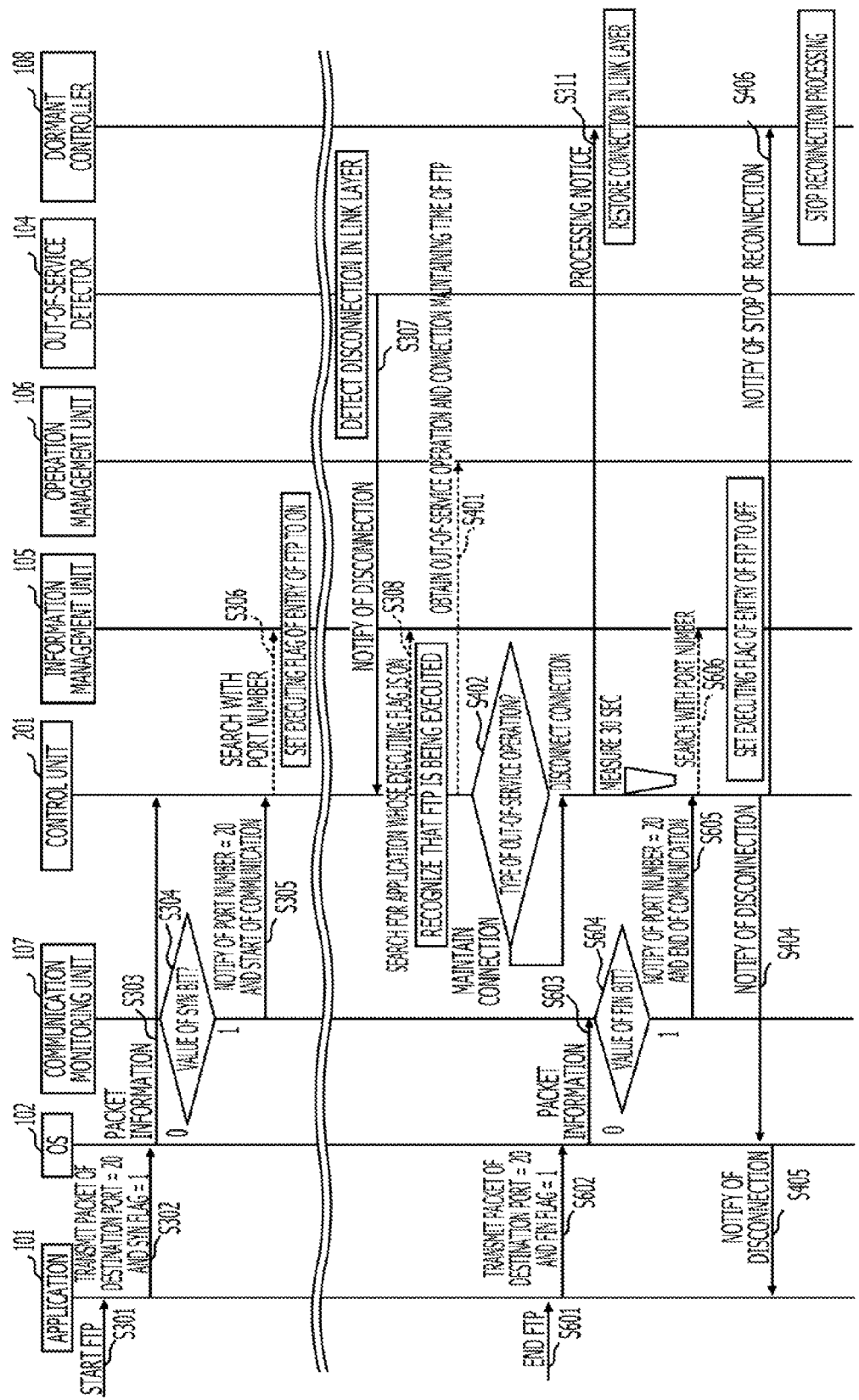
FIG. 12 is a sequence diagram illustrating an example of out-of-service processing according to the second embodiment.

FIG. 12 is a sequence diagram illustrating an example of out-of-service processing 5 according to the second embodiment. The processing 5 describes a case in which the disconnection is notified before the connection maintaining time elapses. In FIG. 12, the same processing steps as those illustrated in FIGS. 8 and 10 are given the same reference symbols as in FIGS. 8 and 10.

In step S601, the application 101 is notified of the end of "FTP" from a user. In step S602, the application 101 sends a packet, in which the destination port number of the "FTP" is set to "20" and the FIN flag is set to "1" when TCP protocol is used, to the OS 102. In step S603, the OS 102 transmits the packet information obtained from the application 101 to the communication monitoring unit 107.

In step S604, the communication monitoring unit 107 determines whether the value of the FIN bit is "1" or "0". In this case, it is assumed that the FIN bit is "1". In step S605, the communication monitoring unit 107 notifies the control unit 201 of the destination port number "20" of the "FTP" and end of the communication.

In step S606, the control unit 201 searches for the destination port number "20" from the application determination information even though the connection maintaining time is being counted. The control unit 201 changes the executing flag corresponding to the searched port number "20" to "OFF". In this way, even though the connection maintaining time is being counted, the restoration processing can be stopped.

The end instruction in step S601 may be a connection stop instruction from a higher layer by a protocol timer exceeding a certain value.

As described above, according to the second embodiment, the connection maintaining time in which the dormant control is performed can be set. According to the second embodiment, the connection maintaining time may be obtained on the basis of the RTT or the RTO. Also, according to the second embodiment, the dormant control may be stopped before the connection maintaining time elapses.

Third Embodiment

Next, a mobile station 3 according to a third embodiment will be described. In the third embodiment, when an application for transmitting a file is executed, the out-of-service operation and the connection maintaining time are set on the basis of the size of transmitted data or a progress state of transmission data or reception data.

Functions

Figure 13:
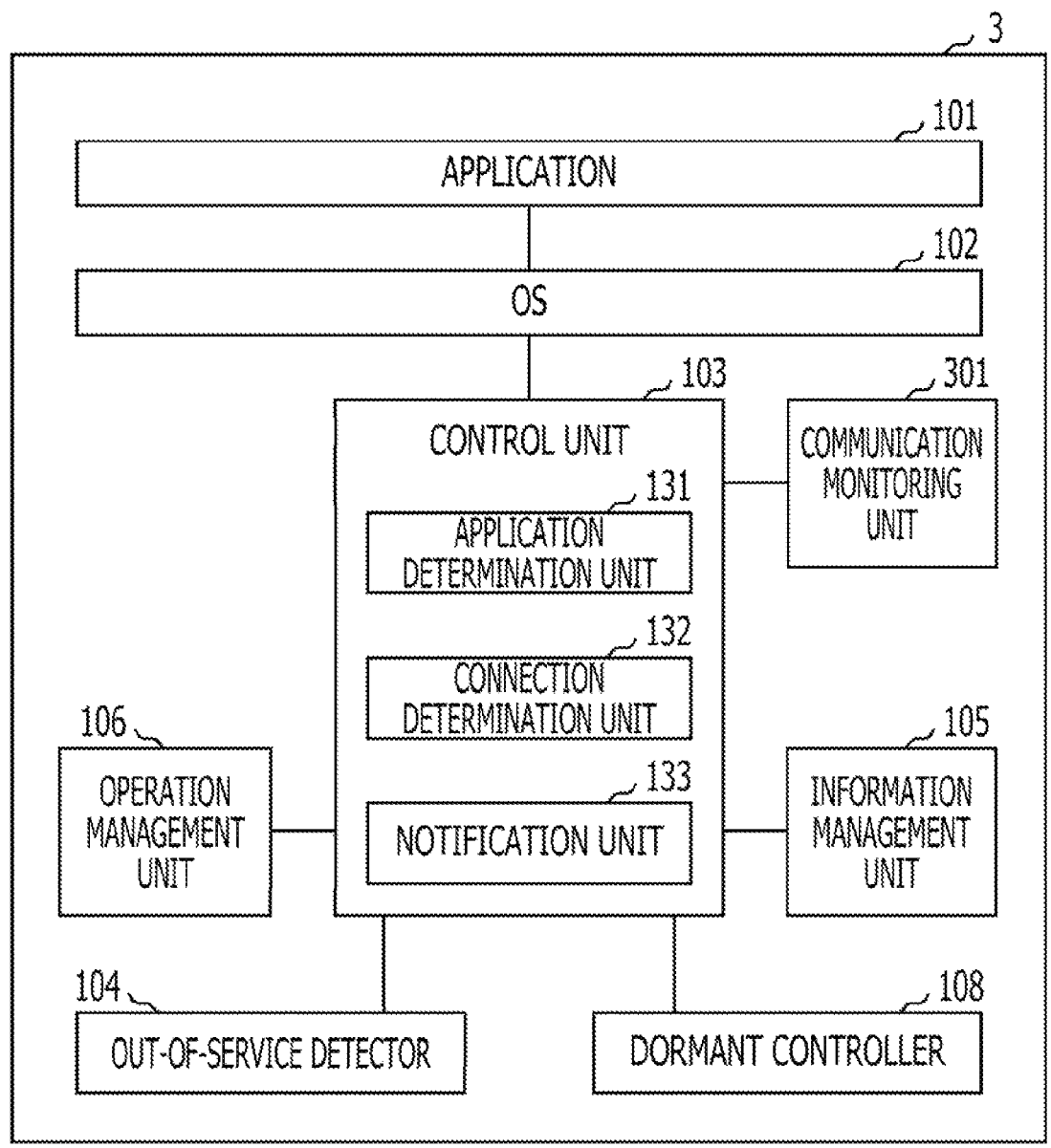
FIG. 13 is a block diagram illustrating an example of functions of a mobile station according to a third embodiment.

FIG. 13 is a block diagram illustrating an example of functions of the mobile station 3 according to the third embodiment. In the functions illustrated in FIG. 13, the same functions as those illustrated in FIG. 3 are given the same reference numerals as in FIG. 3. The communication monitoring unit 301 illustrated in FIG. 13 monitors a packet which is obtained from the OS 102 and, for example, whose destination port number is set to "20". At this time, it is assumed that the application in which the destination port number "20" is set is an application for transmitting data. When the communication monitoring unit 301 detects a packet whose destination port number is "20", the communication monitoring unit 301 analyzes a data portion of the packet and checks whether or not a SIZE command is issued.

When the communication monitoring unit 301 detects that the SIZE command is issued, the communication monitoring unit 301 analyzes a data portion of a response packet from a server corresponding to the packet, and obtains the size of data to be downloaded. If the data size is greater than or equal to a threshold value, the communication monitoring unit 301 sets the "maintaining connection" in the operation management information as the out-of-service operation, and if the data size is smaller than the threshold value, the communication monitoring unit 301 sets the "disconnecting connection" in the operation management information as the out-of-service operation. The threshold value may be set by, for example, an operator inputting a command. The threshold values described below are set in the same manner as mentioned above.

The communication monitoring unit 301 may determine the out-of-service operation on the basis of the amount of data (transmission data) transmitted from the mobile station 3. The communication monitoring unit 301 monitors, for example, a packet whose destination port number is "20", and analyzes a header portion of the packet to obtain the size of the transmission data. The communication monitoring unit 301 accumulates the obtained size of the transmission data and holds the accumulated value of the transmission data. When the accumulated value becomes greater than or equal to a threshold value, the communication monitoring unit 301 sets the "maintaining connection" in the operation management information as the out-of-service operation. In this case, as a default, the "disconnecting connection" is set as the out-of-service operation of the application corresponding to the destination port number "20".

The communication monitoring unit 301 may determine the out-of-service operation on the basis of the amount of data (reception data) received by the mobile station 3. The communication monitoring unit 301 monitors, for example, a packet whose transmission source port number is "20", and analyzes the header of the packet to obtain the size of the reception data. The communication monitoring unit 301 accumulates the obtained size of the reception data and holds the accumulated value of the reception data. When the accumulated value becomes greater than or equal to a threshold value, the communication monitoring unit 301 sets the "maintaining connection" in the operation management information as the out-of-service operation.

The communication monitoring unit 301 may set the connection maintaining time described in the second embodiment on the basis of the data size of data to be downloaded. For example, the communication monitoring unit 301 sets the connection maintaining time to be long when the data size of the data to be downloaded is large, and sets the connection maintaining time to be short when the data size is small.

The communication monitoring unit 301 may set the connection maintaining time on the basis of a progress state of transmission of the transmission data or a progress state of reception the reception data. The progress state of transmission can be obtained by dividing the accumulated value of the sizes of the transmission data by the total size of the transmission data. The progress state of reception can be obtained by dividing the accumulated value of the sizes of the reception data by the total size of the reception data (for example, the file size of data to be downloaded).

For example, when the progress state exceeds 50%, the communication monitoring unit 301 sets the connection maintaining time to be long, and when the progress state is less than 50%, the communication monitoring unit 301 sets the connection maintaining time to be short. In this way, it is possible to determine the out-of-service operation or the connection maintaining time in accordance with the total size of transmitted/received data or a progress state of transmission/reception of data.

Operation

Figure 14:
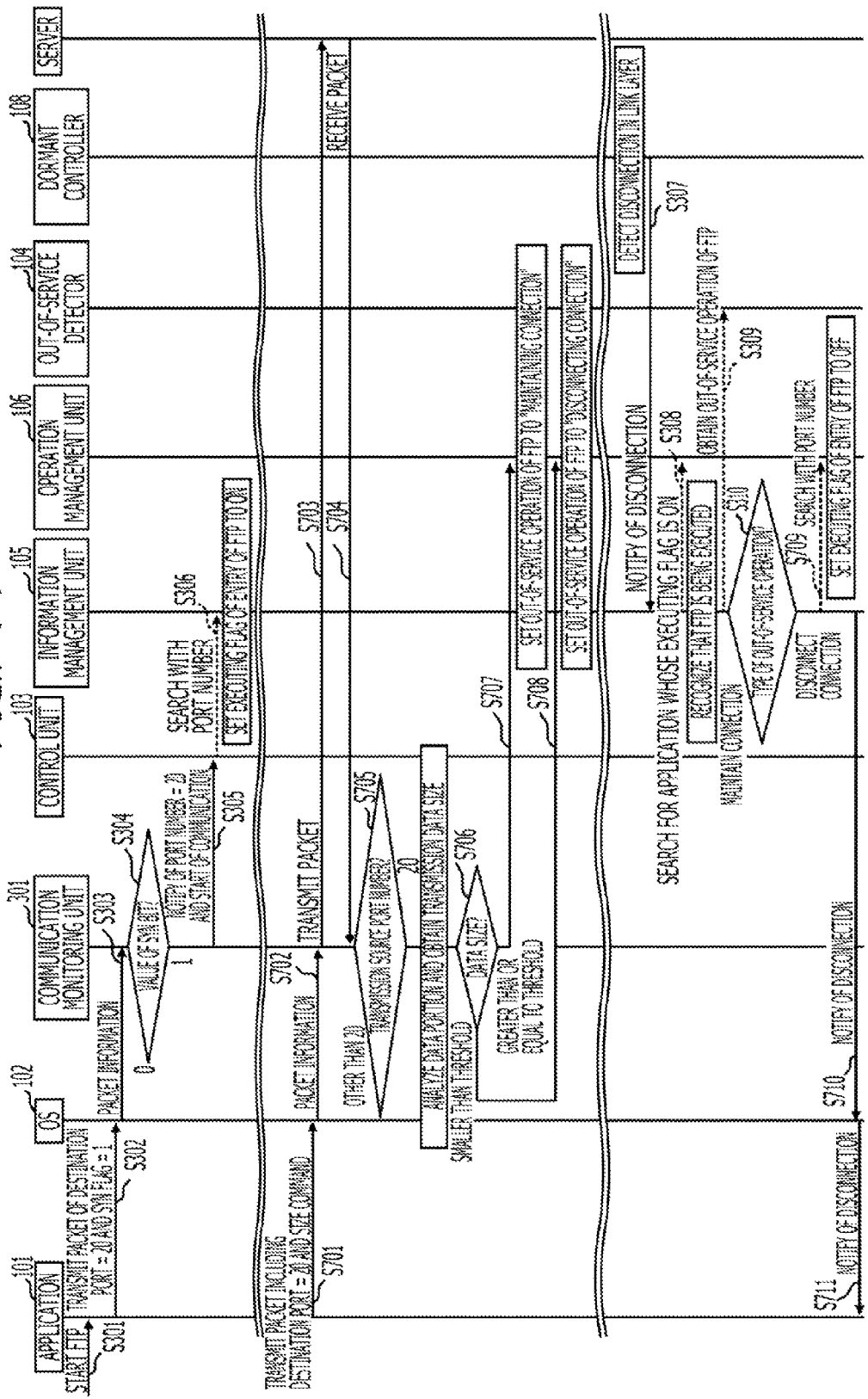
FIG. 14 is a sequence diagram illustrating an example of out-of-service processing according to the third embodiment.

FIG. 14 is a sequence diagram illustrating an example of out-of-service processing 6 according to the third embodiment. In the processing steps illustrated in FIG. 14, the same processing steps as those illustrated in FIG. 8 are given the same reference symbols as in FIG. 8. In step S701, the application 101 transmits a packet including a destination port number "20" and a SIZE command to the OS 102. In steps S702 and S703, the OS 102 transmits the packet to a server. At this time, the communication monitoring unit 301 monitors the packet in which the destination port number "20" is set, and analyzes a data portion of the packet to check whether or not the SIZE command is issued.

When the communication monitoring unit 301 confirms that the SIZE command is issued, in steps S704 and S705, the communication monitoring unit 301 determines the packet whose destination port number is "20". The communication monitoring unit 301 analyzes the data portion of the packet whose destination port number is "20", and obtains the size of the data. The size of the data is, for example, the file size.

In step S706, if the obtained data size is greater than or equal to a threshold value, in step S707, the communication monitoring unit 301 sets the "maintaining connection" in the operation management information as the out-of-service operation. If the obtained data size is smaller than the threshold value, in step S708, the communication monitoring unit 301 sets the "disconnecting connection" in the operation management information as the out-of-service operation. Here, for example, it is assumed that the communication monitoring unit 301 sets the "disconnecting connection" in the operation management information as the out-of-service operation because the obtained data size is small.

Since the control unit 103 obtains the "disconnecting connection" as the type of the out-of-service operation, in step S709, the control unit 103 searches for the destination port number "20" from the application determination information. The control unit 103 changes the executing flag corresponding to the searched destination port number "20" to "OFF".

In step S710, the control unit 103 notifies the OS 102 of disconnection of the connection. In step S711, the OS 102 notifies the application 101 of disconnection of the connection. In this way, the application 101 disconnects the logical connection.

Figure 15:
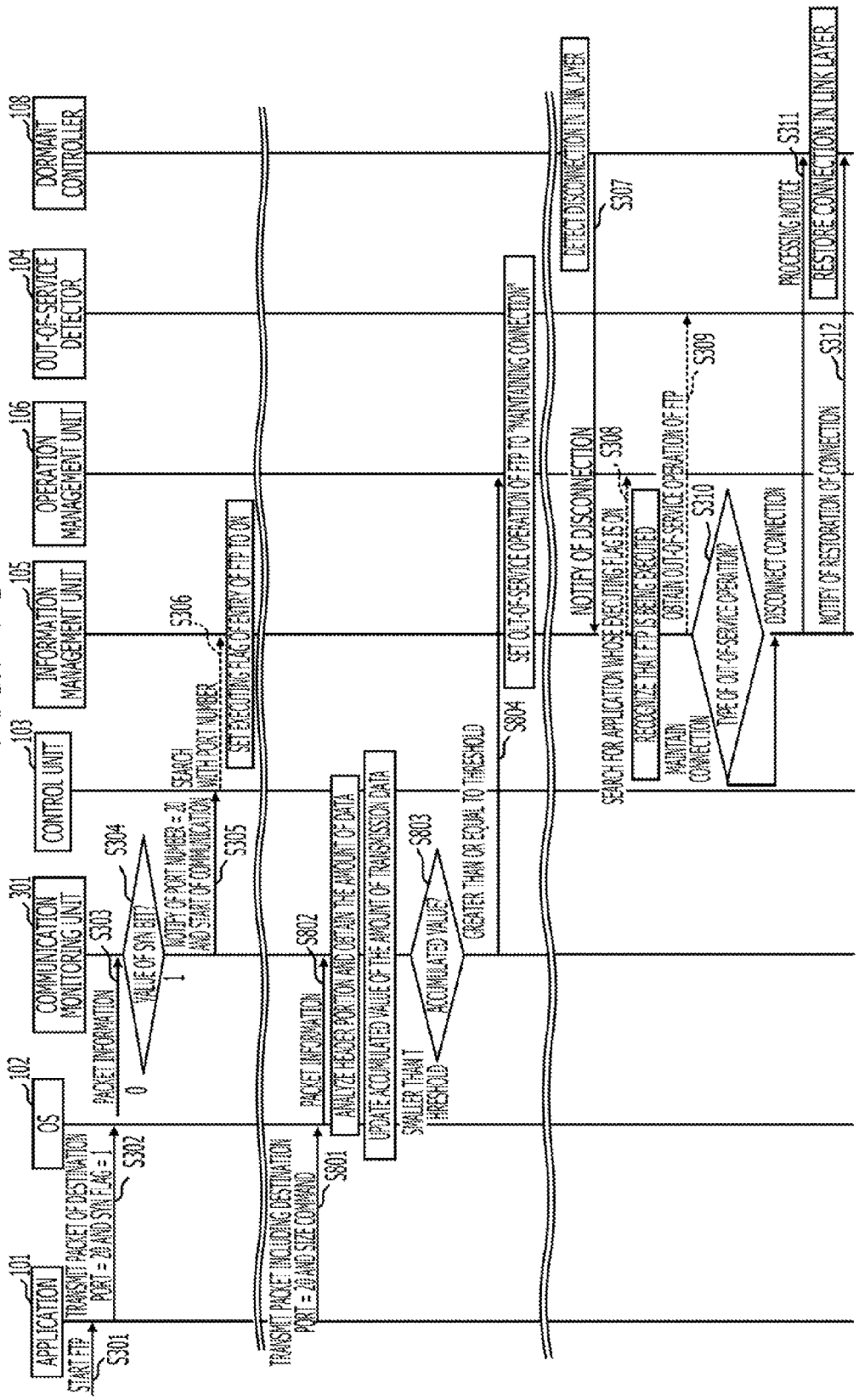
FIG. 15 is a sequence diagram illustrating an example of out-of-service processing according to the third embodiment.

FIG. 15 is a sequence diagram illustrating an example of out-of-service processing 7 according to the third embodiment. In the processing steps illustrated in FIG. 15, the same processing steps as those illustrated in FIG. 8 are given the same reference symbols as in FIG. 8. In step S801, the application 101 transmits a packet including a destination port number "20" and a SIZE command to the OS 102. In step S802, the OS 102 transmits the packet. At this time, the communication monitoring unit 301 monitors the packet in which the destination port number "20" is set, analyzes a header portion of the packet to obtain the size of the data, and calculates an accumulated value of the amount of transmission data.

In step S803, the communication monitoring unit 301 determines whether or not the accumulated value of the amount of transmission data is greater than or equal to a threshold value. When the accumulated value of the amount of transmission data becomes greater than or equal to the threshold value, in step S804, the communication monitoring unit 301 sets the "maintaining connection" in the operation management information as the out-of-service operation. In this case, it is assumed that the accumulated value of the amount of transmission data becomes greater than or equal to the threshold value. In this way, if the accumulated value of the amount of transmission data is greater than or equal to the threshold value, as out-of-service operation, it is possible to perform the restoration processing of the connection in the link layer while maintaining the logical connection of the application.

As described above, according to the third embodiment, when an application for transmitting data is executed, it is possible to set the out-of-service operation or the connection maintaining time on the basis of the size of transmitted data or a progress state of transmission of the transmission data or the reception data.

Fourth Embodiment

Next, a mobile station 4 according to a fourth embodiment will be described. In the fourth embodiment, if a plurality of applications are executed when out-of-service is detected, an out-of-service operation is determined for each application.

Functions

Figure 16:
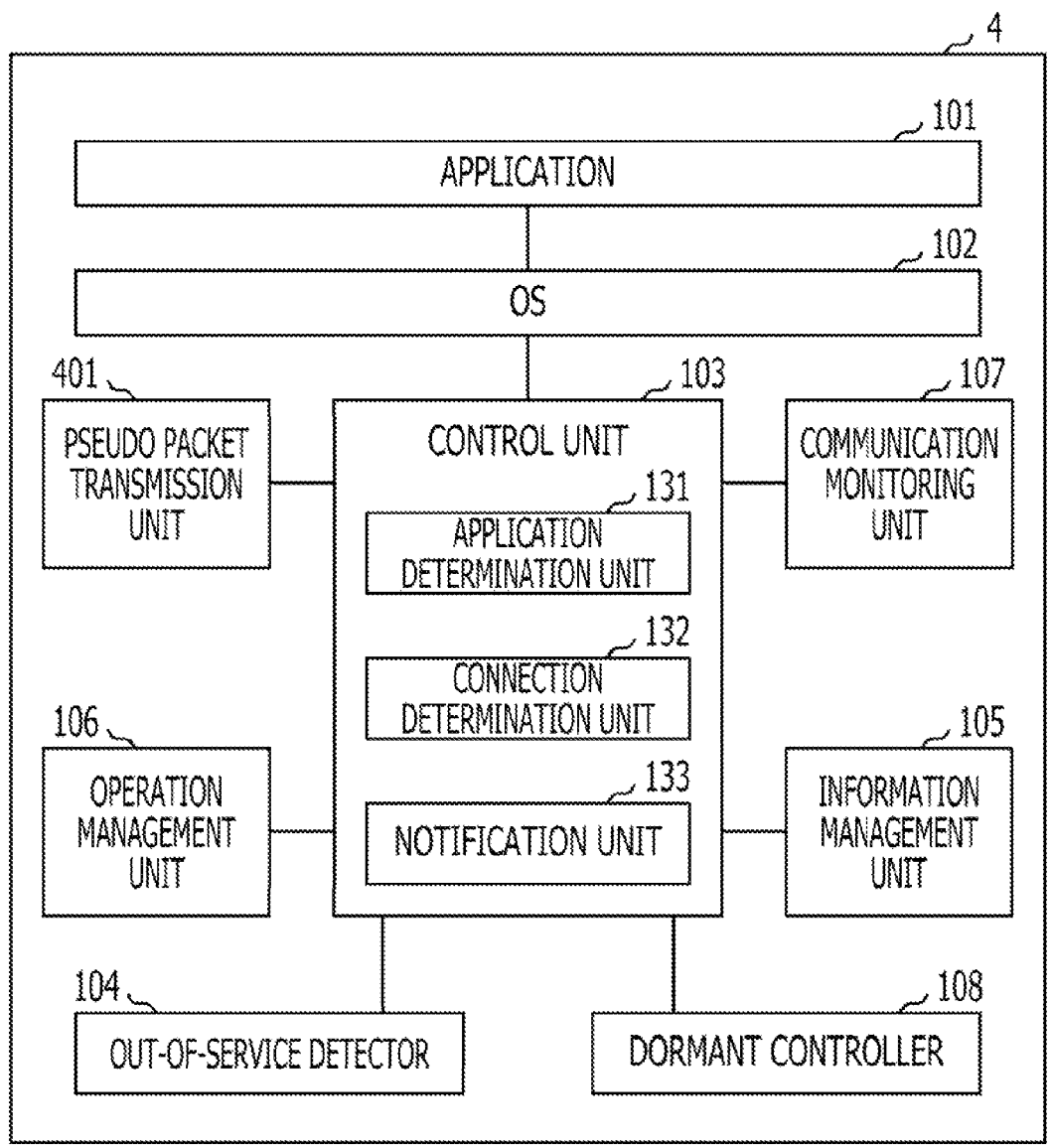
FIG. 16 is a block diagram illustrating an example of functions of a mobile station according to a fourth embodiment.

FIG. 16 is a block diagram illustrating an example of functions of the mobile station 4 according to the fourth embodiment. In the functions illustrated in FIG. 16, the same functions as those illustrated in FIG. 3 are given the same reference numerals as in FIG. 3. A pseudo packet transmission unit 401 illustrated in FIG. 16 transmits a pseudo packet indicating disconnection of the connection to the application 101. By transmitting a pseudo packet, even when a plurality of applications are executed, a connection of an arbitrary application can be disconnected.

Operation

Figure 17:
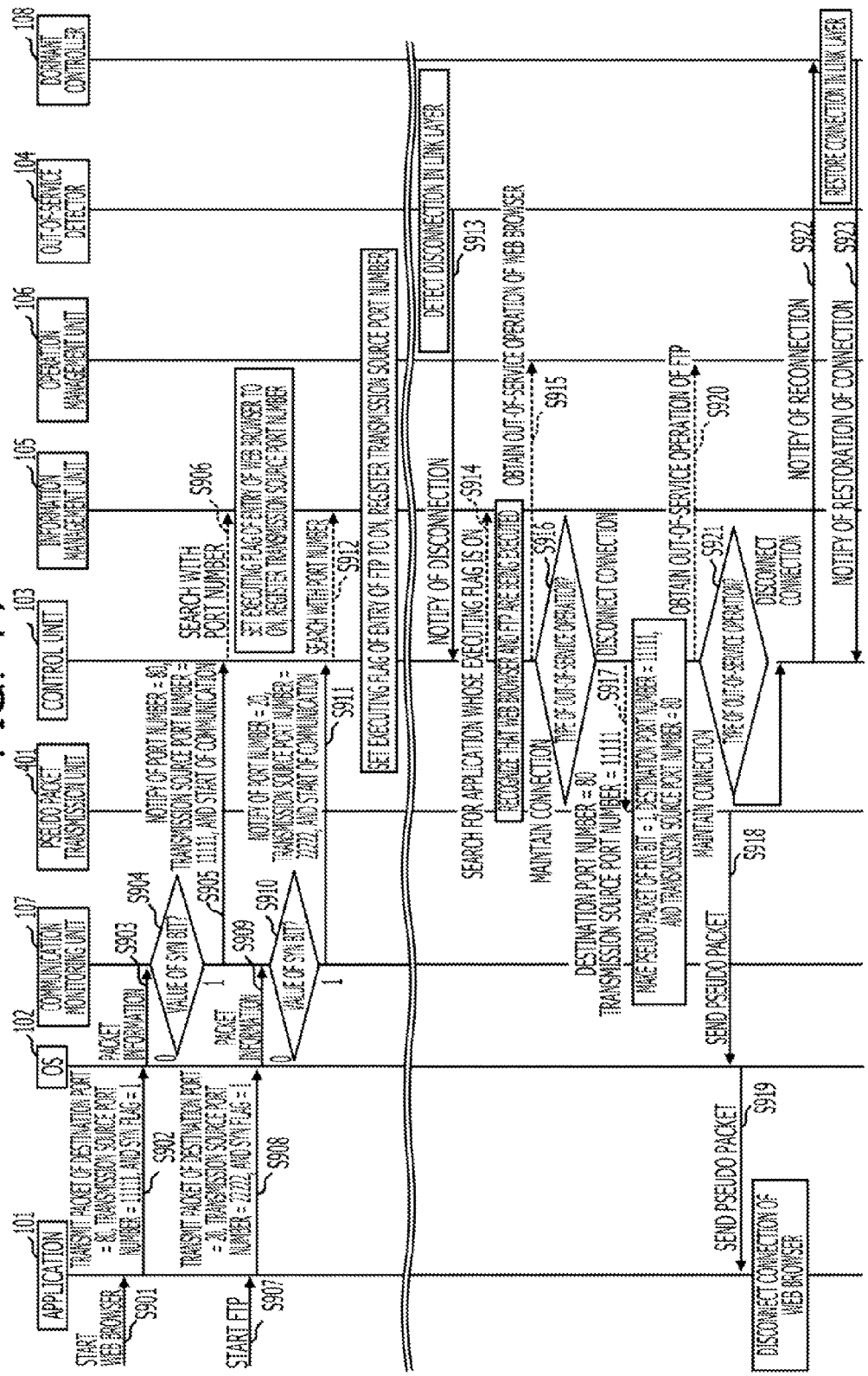
FIG. 17 is a sequence diagram illustrating an example of out-of-service processing according to the fourth embodiment.

FIG. 17 is a sequence diagram illustrating an example of out-of-service processing 8 according to the fourth embodiment. In step S901, a user starts a Web browser. In steps S902 and S903, to start communication with a server, the application 101 (Web browser) transmits a packet in which the destination port number of the TCP header is set to "80" and the SYN bit is set to "1" to the server via the OS. At this time, the application 101 can specify an unused port number as the transmission source port number. In the fourth embodiment, it is assumed that "11111" is specified.

In step S904, the communication monitoring unit 107 analyzes the packet, detects that the SYN bit is "1", and thus determines that communication is started. In step S905, the communication monitoring unit 107 notifies the control unit 103 of the destination port number "80", the transmission source port number "11111", and the detection of the start of communication.

In step S906, when the control unit 103 receives the notification of the start of communication, the destination port number "80", and the transmission source port number "11111" from the communication monitoring unit 107, the control unit 103 searches the information management unit 105. The control unit 103 sets the executing flag of a searched entry having the port number of 80 to "ON", and registers the transmission source port number "11111" into the information management unit 105.

In step S907, a user starts an FTP application. In steps S908 and S909, to start data communication with a server, the application 101 (FTP application) transmits a packet in which the destination port number of the TCP header is set to "20" and the SYN bit is set to "1" to the server via the OS 102. At this time, the application 101 may specify an unused port number as the transmission source port number. In the fourth embodiment, it is assumed that "22222" is specified.

In step S910, the communication monitoring unit 107 analyzes the packet and detects that the SYN bit is "1". In step S911, the communication monitoring unit 107 determines that communication is started and notifies the control unit 103 of the destination port number "20", the transmission source port number "22222", and the detection of the start of communication.

In step S912, when the control unit 103 receives the notification of the start of communication, the destination port number "20", and the transmission source port number "22222" from the communication monitoring unit 107, the control unit 103 searches the information management unit 105. The control unit 103 sets the executing flag of a searched entry having the port number of 20 to "ON", and registers the transmission source port number "22222" into the information management unit 105. Steps S901 to S906 and steps S907 to S912 may be performed regardless of each other.

In step S913, for example, when the out-of-service detector 104 detects that the connection in the link layer of the mobile station 4 is disconnected, the out-of-service detector 104 notifies the control unit 103 that the connection in the link layer of the mobile station 4 is disconnected. In step S914, the control unit 103 refers to the information management unit 105 and recognizes that the Web browser and the FTP application are being executed because the executing flags are "ON".

In step S915, the control unit 103 refers to the operation management information managed in the operation management unit 106, searches for an entry whose application type is Web browser, and obtains the out-of-service operation. In the fourth embodiment, it is assumed that the out-of-service operation of the Web browser is the "disconnecting connection".

In step S916, the control unit 103 determines the type of the out-of-service operation of the Web browser. In step S917, to disconnect the logical connection of the Web browser, the control unit 103 sends a notice of the destination port number and the transmission source port number to the pseudo packet transmission unit 401 to perform processing.

In step S918, the pseudo packet transmission unit 401 makes, in a pseudo manner, a packet to disconnect the logical connection with the Web browser, and sends the packet to the OS 102. For example, the pseudo packet is a packet in which the FIN bit of the TCP header is set to "1", the transmission source port number is set to 80, and the destination port number is set to "11111".

In step S919, the OS 102 sends the packet received from the pseudo packet transmission unit 401 to the Web browser. The Web browser recognizes that the wireless connection is disconnected by the packet, and disconnects the logical connection.

In step S920, the control unit 103 refers to the operation management information managed in the operation management unit 106, searches for an entry whose application type is FTP, and obtains the out-of-service operation. In the fourth embodiment, it is assumed that the out-of-service operation of the FTP is the "maintaining connection".

In step S921, the control unit 103 determines the type of the out-of-service operation of the FTP application. In step S922, to restart the communication of the FTP application, the control unit 103 sends a notice of reconnection to the dormant controller 108, and starts measurement of the connection maintaining time of "30 sec". In step S923, if the connection is restored within 30 sec, the dormant controller 108 notifies the control unit 103 that the connection is restored. Steps S915 to S919 and steps S920 to S923 may be performed regardless of each other.

As described above, according to the fourth embodiment, if a plurality of applications are executed when out-of-service is detected, an appropriate out-of-service operation can be determined for each application.

Next, modified examples of the above-described embodiments will be described. It is possible to implement the above-described out-of-service processing by converting the processing procedures of the out-of-service processing described in the above embodiments into a program to be executed by a mobile station, installing the program in the mobile station, and causing the mobile station to execute the program.

The program is transmitted to a mobile station via the Internet, and the mobile station that receives the program installs the program in the mobile station, and thereby it is possible to implement the above-described out-of-service processing. The above described processing may be implemented in an integrated circuit that processes digital signals. The above-described mobile stations are basically applied to a portable terminal, and further the mobile stations can be applied to a fixed terminal that becomes out-of-service depending on a period of time.

Although the embodiments have been described in detail, the present invention is not limited to a specific embodiment, but within the scope of the claims, various modifications and changes can be made in addition to the above-described modified examples.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile station for wirelessly communicating with a base station, the mobile station comprising:
a storage unit for storing determination information for determining whether or not one or more of a plurality of applications that requires wireless communication is being executed and operation information defining a preset condition for each of the plurality of applications, the preset condition indicates whether or not each of the plurality of applications is to either maintain a logical connection when the mobile station is in an out-of-service state or disconnect a logical connection when the mobile station is in the out-of-service state; and
a processor for, when detecting out-of-service state, determining each of the plurality of applications being executed on the basis of the determination information,
determining, for each of the one or more of the plurality of applications
being executed, whether or not an application is to maintain a logical connection or disconnect a logical connection when the mobile station is in the out-of-service state on the basis of the operation information,
when determining that an application is to disconnect a logical connection when the mobile station is in the out-of-service state, disconnecting the logical connection for that application, and
when determining that an application is to maintain a logical connection when the mobile station is in the out-of-service state, maintaining the logical connection for that application and trying to wirelessly connect to the base station.

2. A mobile station according to claim 1, wherein
the preset condition further indicates, for each application that is to maintain a logical connection when the mobile station is in an out-of-service state, a predetermined time period for maintaining the logical condition, and
when the processor tries to wirelessly connect to the base station but does not connect to the base station within the predetermined time period, disconnecting the logical connection.

3. A mobile station according to claim 2, wherein
the predetermined time period is calculated from a retransmission time-out value based on a time period from when data is transmitted to when a response is received.

4. A mobile station according to claim 2, wherein
the processor sets the predetermined time period on the basis of data that has been transmitted, when the application being executed is an application with data transmission.

5. A mobile station according to claim 1, wherein
the processor transmits pseudo information indicating the mobile station is in an out-of-service state to only the applications whose logical connection is disconnected.

6. A mobile station according to claim 1, wherein the processor performs restoration processing of wireless connection when the mobile station is out of service area.

7. A mobile station according to claim 1, wherein the processor performs restoration processing of wireless connection when the mobile station returns to a service area.

8. A communication control method, performed by a processor located in a mobile station that wirelessly communicates with a base station, the communication control method comprising:
   detecting, by the processor, an out of service state of the mobile station;
   determining, by the processor, each of a plurality of applications being executed by the mobile station;
   determining, by the processor, for each of the one or more of the plurality of applications being executed, whether or not an application is to maintain a logical connection or disconnect a logical connection when the mobile station is in the out-of-service state;
   when determining that an application is to disconnect a logical connection when the mobile station is in the out-of-service state, disconnecting, by the processor, the logical connection for that application; and
   when determining that an application is to maintain a logical connection when the mobile station is in the out-of-service state, maintaining, by the processor, the logical connection for that application and trying to wirelessly connect to the base station.

9. A communication control method according to claim 8, wherein
   the processor further determines, for each application that is to maintain a logical connection when the mobile station is in an out-of-service state, a predetermined time period for maintaining the logical condition, and
   when the processor tries to wirelessly connect to the base station but does not connect to the base station within a predetermined time period, disconnecting the logical connection.

10. A communication control method according to claim 9, wherein
   the predetermined time period is calculated from a retransmission time-out value based on a time period from when data is transmitted to when a response is received.

11. A communication control method according to claim 9, setting, by the processor, the predetermined time period on the basis of data that has been transmitted, when the application being executed is an application with data transmission.

12. A communication control method according to claim 8, wherein the processor, transmits pseudo information indicating the mobile station is in an out-of-service state to only the applications whose logical connection is disconnected.

13. A communication control method according to claim 8, performing, by the processor, restoration processing of wireless connection when the mobile station is out of service area.

14. A communication control method according to claim 8, performing, by the processor, restoration processing of wireless connection when the mobile station returns to a service area.

15. A mobile station for wirelessly communicating with a base station, the mobile station comprising:
   a storage unit for storing determination information for determining whether or not one or more of a plurality of applications that requires wireless communication is being executed; and
   a processor for
      monitoring, for each of the plurality of applications being executed, a size of data transmitted or received by each of the plurality of applications,
      setting, for each application of the plurality of applications being executed, when the size of data transmitted or received by the application is greater than predetermined size, a first preset condition that indicates that the application is to maintain a logical connection when the mobile station is in the out-of-service state,
      setting, for each application of the plurality of applications being executed, when the size of data transmitted or received by the application is less than or equal to a predetermined size, a second preset condition that indicates that the application is to disconnect a logical connection when the mobile station is in the out-of-service state, and
      when the mobile station is in an out-of-service state, maintaining or disconnecting the logical connection of each application based on the preset condition of each application.

* * * * *